(No Model.)
J. W. ORPHY.
Lantern.
No. 229,452. Patented June 29, 1880.
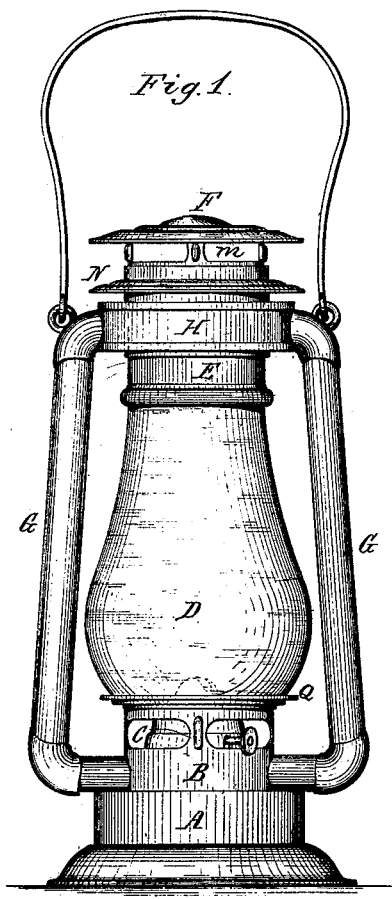
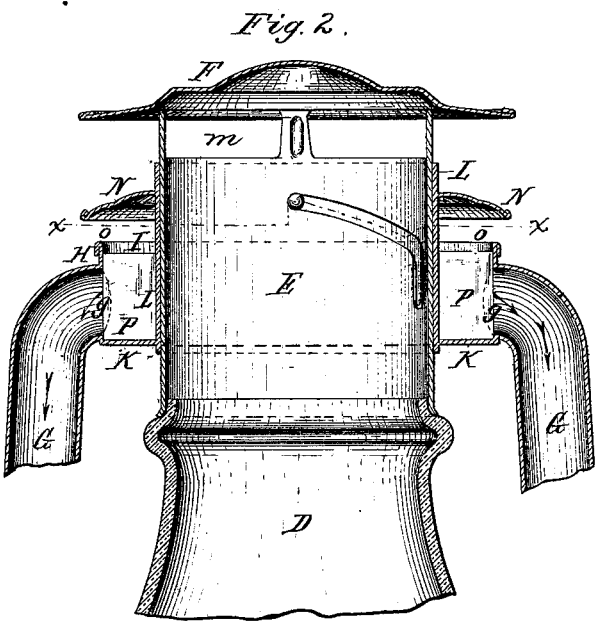
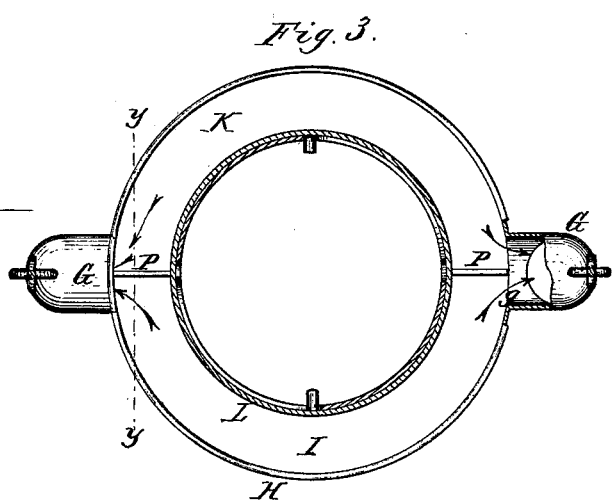
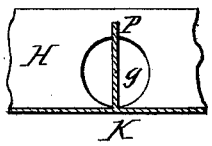
Witnesses: Chas. J. Buchheit, Edw. J. Brady.
J. W. Orphy, Inventor.
By Wilhelm & Bonner, Attorneys.

United States Patent Office.

JOHN W. ORPHY, OF ROCHESTER, NEW YORK, ASSIGNOR TO CHAS. T. HAM AND F. D. W. CLARKE, OF SAME PLACE.

LANTERN.

SPECIFICATION forming part of Letters Patent No. 229,452, dated June 29, 1880.

Application filed April 27, 1880. (No model.)

*To all whom it may concern:*

Be it known that I, JOHN W. ORPHY, of the city of Rochester, in the county of Monroe and State of New York, have invented new and useful Improvements in Lanterns, of which the following is a specification, reference being had to the accompanying drawings.

This invention relates to that class of lanterns in which the air for the support of combustion is supplied to the flame through tubes which are provided with air-inlets near the top of the globe or chimney, and which have their lower ends connected with an air-chamber arranged below the burner and communicating therewith.

The object of this invention is to produce a simple and compact lantern of this character, in which the mouths of the tubes are fully protected against passing air-currents, so that the flame is not extinguished when the lantern is exposed to air-currents or violently agitated.

My invention consists of the peculiar construction and arrangement of the devices whereby the mouths of the tubes are protected against passing air-currents, as will be hereinafter fully set forth.

In the accompanying drawings, Figure 1 is an elevation of a lantern provided with my improvement. Fig. 2 is a sectional elevation, on an enlarged scale, of the upper part of the lantern. Fig. 3 is a horizontal section in line *x x*, Fig. 2. Fig. 4 is a vertical section in line *y y*, Fig. 3.

Like letters of reference refer to similar parts in the several figures.

A represents the oil-vessel; B, the air-chamber arranged upon the same and below the burner C, with the dome of which the air-chamber B communicates.

D is the glass globe or chimney; E, the metallic extension thereof, and F the top plate or cap of the lantern, all of ordinary and well-known construction.

G G represent two air-supply tubes arranged outside of the globe on diametrically-opposite sides thereof, and having their lower ends turned inwardly and connected with the air-chamber B. The upper ends of the tubes G are also turned inwardly and connected with a circular band or ring, H, which surrounds the chimney-extension E, and forms the outer wall of an annular gutter or trough, I, which is open at the top and closed at its sides and bottom.

K represents an annular plate, which forms the bottom of the annular trough I, and which is arranged below the mouths *g* of the air-supply tubes.

L is a cylindrical sleeve or collar which surrounds the metallic extension E of the chimney, and which forms the inner wall of the trough I. The bottom plate, K, of the trough is secured with its outer rim to the ring H and with its inner rim to the sleeve L, which latter extends from the bottom plate, K, of the trough upward to the gas-exit opening *m*, below the top plate, F.

N is an annular flange secured to the sleeve L above the trough I, and projecting over the open top thereof at a short distance above the same, so as to close the top of the trough I, with the exception of a narrow annular air-inlet opening, *o*, which is formed between the rim of the flange N and the upper edge of the outer wall, H, of the trough I.

P is a vertical partition arranged radially in the trough I, opposite the center of the mouth of each tube G, and extending from the bottom of the trough nearly to the top thereof. The two plates P divide the trough I into two equal parts or divisions, and prevent air-currents which may have entered the trough from following the outer wall, H, of the trough, and passing by the mouths of the tubes with sufficient force to exhaust the air therefrom and extinguish the flame.

The sleeve L, with the flange N, bottom plate, K, and ring H, are firmly secured to the upper ends of the tubes G, and form an annular frame, in which the cylindrical extension E of the chimney moves in raising and lowering it for releasing or securing the glass globe F.

The plate Q, upon which the globe rests, may be provided with a small number of fine perforations near its edge, to permit a small quantity of cold air to enter the globe, whereby the overheating of the globe is avoided.

The ascensive force of the heated air and products of combustion, rising through the globe F, causes the exterior air to enter the trough I through the annular opening o, and to pass from the trough into the mouths of the tubes G, and down through these tubes to the air-chamber B, and thence under the burner-cone, to supply the flame with oxygen. When the lantern is agitated or exposed to the wind the mouths g of the tubes G are sufficiently protected against passing air-currents to prevent the same from exhausting the air from the tubes, whereby the flame is prevented from being extinguished under these circumstances.

My improved lantern is very simple in construction and produces a steady and brilliant flame, which is not extinguishable by such motions and air-currents to which lanterns are subjected when in practical use.

I claim as my invention—

1. In a lantern, the combination, with the inwardly-turned upper ends of the air-tubes G, of the annular trough I, composed of a bottom plate, K, and an upright circular band or ring, H, in which are formed the mouths g of the tubes G, the annular flange N, which covers the open top of the trough I, and the annular air-inlet opening o, formed between the upper edge of the ring H and the flange N, substantially as set forth.

2. The combination, with the mouths of the air supply tubes G, of the annular trough I, closed at its sides and bottom, the flange N, covering the open top of the trough, an annular air-inlet opening, o, formed between the upper edge of the trough and the flange N, and the vertical partitions P, arranged in the trough opposite the mouths of the air-supply tubes, substantially as set forth.

JOHN W. ORPHY.

Witnesses:
GEORGE W. HAM,
W. P. McKILLIP.